United States Patent
Kiyamura et al.

(10) Patent No.: US 7,734,167 B2
(45) Date of Patent: Jun. 8, 2010

(54) FOCUS CONTROLLER, OPTICAL APPARATUS USING THE SAME, AND CONTROL METHOD

(75) Inventors: Kousuke Kiyamura, Kawasaki (JP); Hiromu Yasuda, Kawasaki (JP); Chikara Aoshima, Zama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/346,203

(22) Filed: Dec. 30, 2008

(65) Prior Publication Data
US 2009/0175611 A1   Jul. 9, 2009

(30) Foreign Application Priority Data
Jan. 8, 2008   (JP) ............................. 2008-001607

(51) Int. Cl.
G03B 3/10   (2006.01)
G03B 13/34  (2006.01)
(52) U.S. Cl. ..................................... 396/133
(58) Field of Classification Search .................. 396/133
See application file for complete search history.

(56) References Cited

U.S. PATENT DOCUMENTS

| 6,999,684 B2 | 2/2006 | Sato et al. .................... 398/125 |
| 2009/0189990 A1* | 7/2009 | Kiyamura et al. ......... 348/220.1 |
| 2009/0190910 A1* | 7/2009 | Yasuda et al. ............... 396/133 |

FOREIGN PATENT DOCUMENTS

| JP | 09-331666 | 12/1997 |
| JP | 2004-109690 | 4/2004 |

* cited by examiner

*Primary Examiner*—Melissa J Koval
(74) *Attorney, Agent, or Firm*—Cowan, Liebowitz & Latman, P.C.

(57) ABSTRACT

A focus controller configured to control focus of an optical system that has a focus lens includes a switching circuit configured to select a first driver for the electrization to a coil of a motor in performing focus control using a first focus detector, and to select a second driver in an electrization to the coil of the motor in performing focus control using a second focus detector. The first driver is configured to switch an electrization to the coil in the motor according to an output of the position sensor. The second driver is configured to switch an electrization to the coil of the motor according to a determined time interval.

6 Claims, 7 Drawing Sheets

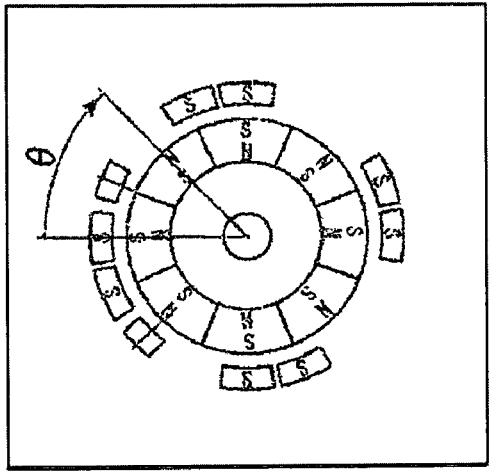
FIG. 5A
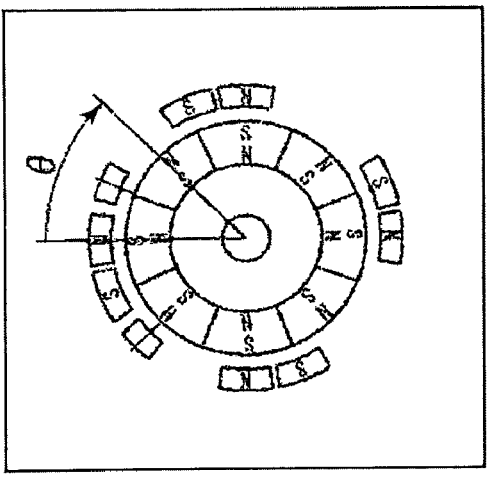
FIG. 5B
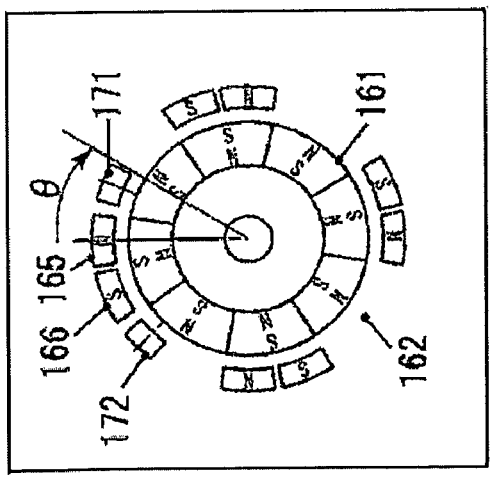
FIG. 5B'
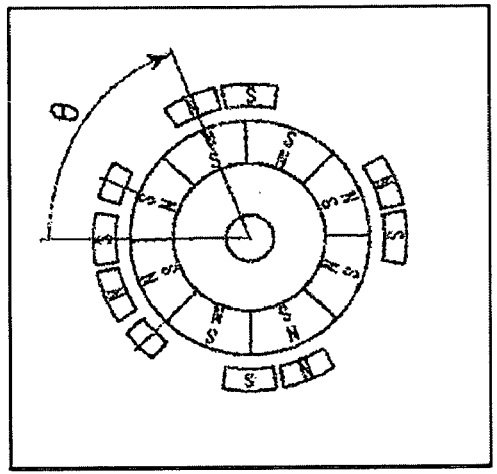
FIG. 5C
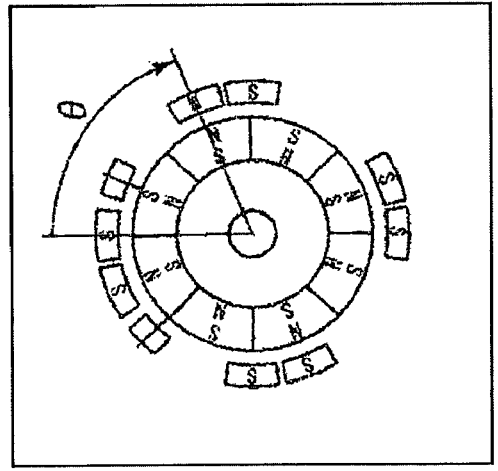
FIG. 5D
FIG. 5D'

FOCUS CONTROLLER, OPTICAL APPARATUS USING THE SAME, AND CONTROL METHOD

BACKGROUND OF THE INVENTION

1. Field of the Invention

The present invention relates to the electrization technology to the coil in the focus control.

2. Description of the Related Art

Conventionally, it is known to employ a stepping motor for a driving source of an autofocus ("AF") controller used for an optical apparatus, such as a camera. In addition, it is also known that the AF uses a phase-difference detection method, an external ranging method, a contrast detection method, or a hybrid method (Japanese Patent Laid-Open No. 2004-109690) that combines the foregoing methods.

The phase-difference detection method splits a luminous flux from a subject, introduces the two split luminous fluxes into two AF sensors, and calculates a defocus amount based on a shift amount or interval between two images output from these sensors. The external ranging method is classified into an active method and a passive method. The active method irradiates an infrared ray or an ultrasonic wave to a subject, detects the reflected wave through a sensor, and measures a distance to the subject based on a time period necessary for the reflected wave to return and an irradiation angle. On the other hand, the passive method splits a luminous flux from a subject, receives the split luminous fluxes with two light receiving sensors (line sensors), and operates a correlation between signals from two sensors. The passive method operates the number of pixels of the line sensor which corresponds to a shift amount that maximizes the correlation, and obtains focusing information based on the shift amount on the triangulation principle. The contrast detection method extracts a high frequency component in a video signal output from an imaging section by reciprocating or wobbling a focus lens, and moves the focus lens to a position that provides a maximum value to obtain the on-focus state.

Other prior art include Japanese Patent Laid-Open No. 09-331666.

The stepping motor is likely to step out due to high-speed driving or load fluctuations. In addition, although the phase-difference detection method or the external ranging method drives the focus lens at a high speed to a target position after obtaining the defocus amount or focusing information, and shortens a focusing time period, the stepping out can occur when these methods use the stepping motor. If a motor having a large step width or a low reduction gear ratio of a transmission mechanism is used for high-speed driving with the stepping motor, a high resolution is hard to obtain and the focusing accuracy deteriorates. In addition, it restricts a wobbling width in the contrast detection system, and degrades the quality of a recorded image. In addition, a high driving resolution of a focus lens is effective so as to improve the focusing accuracy and to provide the degree of freedom to the wobbling width in the contrast detection method. On the other hand, when a motor with a small step width or an enhanced reduction gear ratio of a transmission mechanism is used to obtain a high resolution with a stepping motor, high-speed driving is difficult and a focusing time period is likely to increase.

SUMMARY OF THE INVENTION

The present invention is directed to a focus controller configured to provide high-speed and highly precisely focus control, an optical apparatus using the same, and a control method.

A focus controller according to one aspect of the present invention configured to control focus of an optical system that includes a focus lens includes an AF sensor configured to obtain information corresponding to a distance to a subject based on a luminous flux from the subject, a first focus detector configured to detect a focus state based on a measurement result of the AF sensor, a second focus detector configured to detect the focus state based on a contrast value of an image formed by the optical system, a motor that is configured to drive the focus lens and includes a rotor having a magnet, and a stator having a coil configured to provide a torque to the magnet, a position sensor configured to detect a position of the rotor of the motor, a first driver configured to switch an electrization to the coil in the motor in accordance with an output of the position sensor, a second driver configured to switch the electrization to the coil of the motor in accordance with a preset time interval, and a switching circuit configured to select the first driver for the electrization to the coil of the motor in performing focus control using the first focus detector, and to select the second driver in the electrization to the coil of the motor in performing focus control using the second focus detector.

Further features of the present invention will become apparent from the following description of exemplary embodiments with reference to the attached drawings.

BRIEF DESCRIPTION OF THE DRAWINGS

FIG. 5 is a sectional view in an axial direction showing an operation of a feedback electrization switching mode of a motor shown in FIG. 1.

DESCRIPTION OF THE EMBODIMENTS

Referring now to the accompanying drawings, a description will be given of a focus controller and an optical apparatus according to the present invention.

First Embodiment

Figure 1:
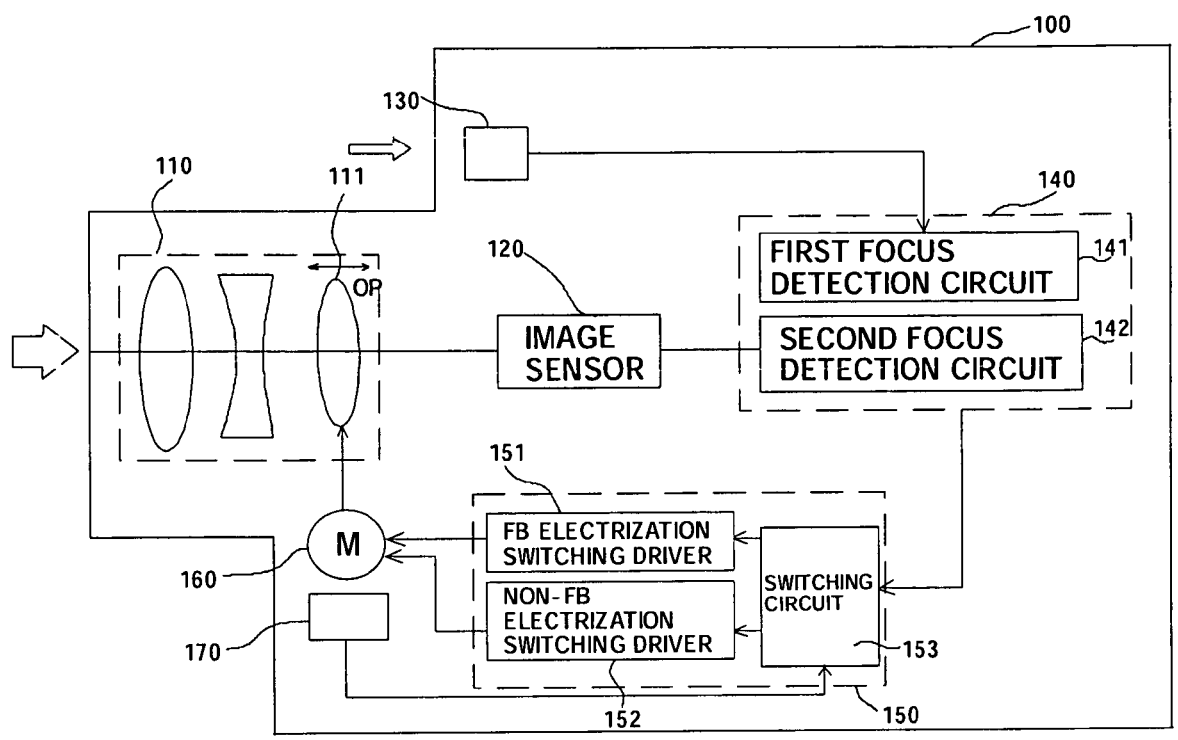
FIG. 1 is a block diagram of an optical apparatus according to a first embodiment.

FIG. 1 is a block diagram of an optical apparatus 100. The optical apparatus 100 generally refers to so-called a digital camera or a video camera, which is an apparatus that captures a static or motion image and displays it on a viewfinder or a liquid crystal screen, or an apparatus that records an image in a recording medium, such as a tape, an individual memory, an optical disc, and a magnetic disc. The optical apparatus 100 includes an optical system 110, and a focus controller. The focus controller controls a focus of the optical system 110, and is a hybrid AF unit that includes a plurality of types of focus control means so as to realize the AF. In this embodiment, the focus controller uses the external ranging method and the contrast detection method, but may use the phase-difference detection method and the contrast method. The focus controller includes an image sensor 120, an AF sensor 130, a focus control circuit 140, a motor driving circuit 150, a motor 160, and a position sensor 170.

The optical system 110 is a lens group or the like, and includes a focus lens (or lenses) 111. The light from the subject passes the optical system 110 and enters the image sensor 120. The focus lens 111 is driven by the motor 160. An image magnification hardly changes even when the focus lens 111 is finely reciprocated or wobbled in an optical-axis direction OP, and only a focal length changes. Therefore, a focal point of an image formed on the image sensor 120 can be controlled by moving the focus lens 111 in the optical-axis direction OP.

The image sensor 120 includes a photoelectric conversion element, such as a CCD or a CMOS sensor. An output signal obtained through the photoelectric conversion in the image sensor 120 is amplified by an image processing circuit (not shown) arranged between the image sensor 120 and a second focus detection circuit 142, and output as a digital video signal. The optical apparatus 100 forms a motion image or a static image by using this video signal. In addition, the digital video signal is input to the second focus detection circuit 142, which will be described later. The image processing circuit detects a contrast value of a screen based on a signal that has been converted into an electric signal by the image sensor 120, and the image processing circuit can recognize a focus state of the focus lens 111.

The AF sensor 130 detects the light from the subject, and outputs a detection signal. The AF sensor 130 emits the infrared light to the subject by using an infrared light emitting element (IrLED). It receives the infrared light reflected on the subject through its light receiving element, and detects a focus state of the optical system 110 based on the output of the light receiving element. The obtained detection signal is input into a first focus detection circuit 141, which will be described later. A method by which the AF sensor 130 detects the focus (control) state is not limited. The AF sensor 130 may be a sensor that irradiates an ultrasonic wave onto the subject, and detects a reflected wave. The light from the subject may be split into two luminous fluxes, and a pair of AF sensors may detect the respective images. The light from the subject may be directly detected or a method for splitting and detecting the light incident upon the optical system 110. Thus, the AF sensor 130 may detect a distance to the subject for the external ranging method, or an interval or shift amount between two images generated from the luminous flux from the subject for the phase-difference detection method. In other words, the AF sensor 130 obtains information corresponding to the distance to the subject based on the luminous flux from the subject. By obtaining the information indicative of the difference to the subject, the lens can be focused according to the distance.

The focus control circuit 140 includes a first focus detection circuit 141 (first focus detector) and a second focus detection circuit 142 (second focus detector). The first focus detection circuit 141 detects a focus state based on a measurement result of the AF sensor 130. More specifically, the first focus detection circuit 141 outputs a driving target signal of the focus lens 111 based on the detection signal from the AF sensor 130. The second focus detection circuit 142 detects a focus state based on a contrast value of the image formed by the optical system 110. More specifically, the second focus detection circuit 142 outputs the driving target signal of the focus lens 111 based on the digital video signal output from the image sensor 120. An operation of the focus control circuit 140 will be described later.

The motor driving circuit 150 drives the motor 160 in accordance with the driving target signal of the focus lens 111 output from the focus control circuit 140. The motor driving circuit 150 will be discussed later. The motor 160 rotates in accordance with an output of the motor driving circuit 150, and drives the focus lens 111. A structure of the motor will be described later.

A position sensor 170 detects a rotor position of the motor 160, and outputs a detection signal.

A description will now be given of the focus control operation of the focus control circuit 140. This embodiment changes between the external ranging method by the first focus detection circuit 141 and the contrast detection method by the second focus detection circuit 142 for the focus control operation. After the focus lens 111 is moved to a position near the target position operated by the external ranging method (rough focus mode), the mode is switched to the contrast detection method, and the focus lens 111 is moved to a final on-focus position (fine focus mode). A description will be given of these two focus control operations.

A method of switching these two focus control operations is not limited. These two focus control operations may be switched based on a variety of imaging conditions, or a photographer may switch the two focus control operations that have been made selectable. This embodiment sets to a default the focus control using the first focus detection circuit 141, and inputs an output of the first focus detection circuit 141 into the motor driving circuit 150 in the default.

A description will now be given of focus control (by the external ranging method) using the first focus detection circuit 141. The first focus detection circuit 141 calculates a driving target amount of the focus lens 111 based on a defocus amount calculated based on the detection signal output from the AF sensor 130 and the sensitivity of the focus lens 111. The driving target amount is a moving amount from the current position of the focus lens 111 to an on-focus position or its vicinity. The first focus detection circuit 141 calculates a driving amount of the motor 160 necessary to drive the focus lens 111, and outputs the driving target signal. In this method, as soon as the detection signal is output from the AF sensor 130, the driving amount and driving direction are immediately determined. A shortened time period necessary for the focus lens 111 to reach the target driving position (on-focus position or its vicinity) provides a quick focus control operation, and for the quick focusing operation, the motor 160 that drives the focus lens 111 is required for high-speed driving.

Next follows a description of the focus control (by the contrast detection method) which uses the second focus detection circuit 142. The second focus detection circuit 142 extracts, by using a band-pass filter, etc., a high frequency component indicative of the sharpness of an image from the digital video signal output from the image sensor 120, and controls driving of the focus lens 111 so that its value or an AF evaluation value becomes maximum.

Figure 2:
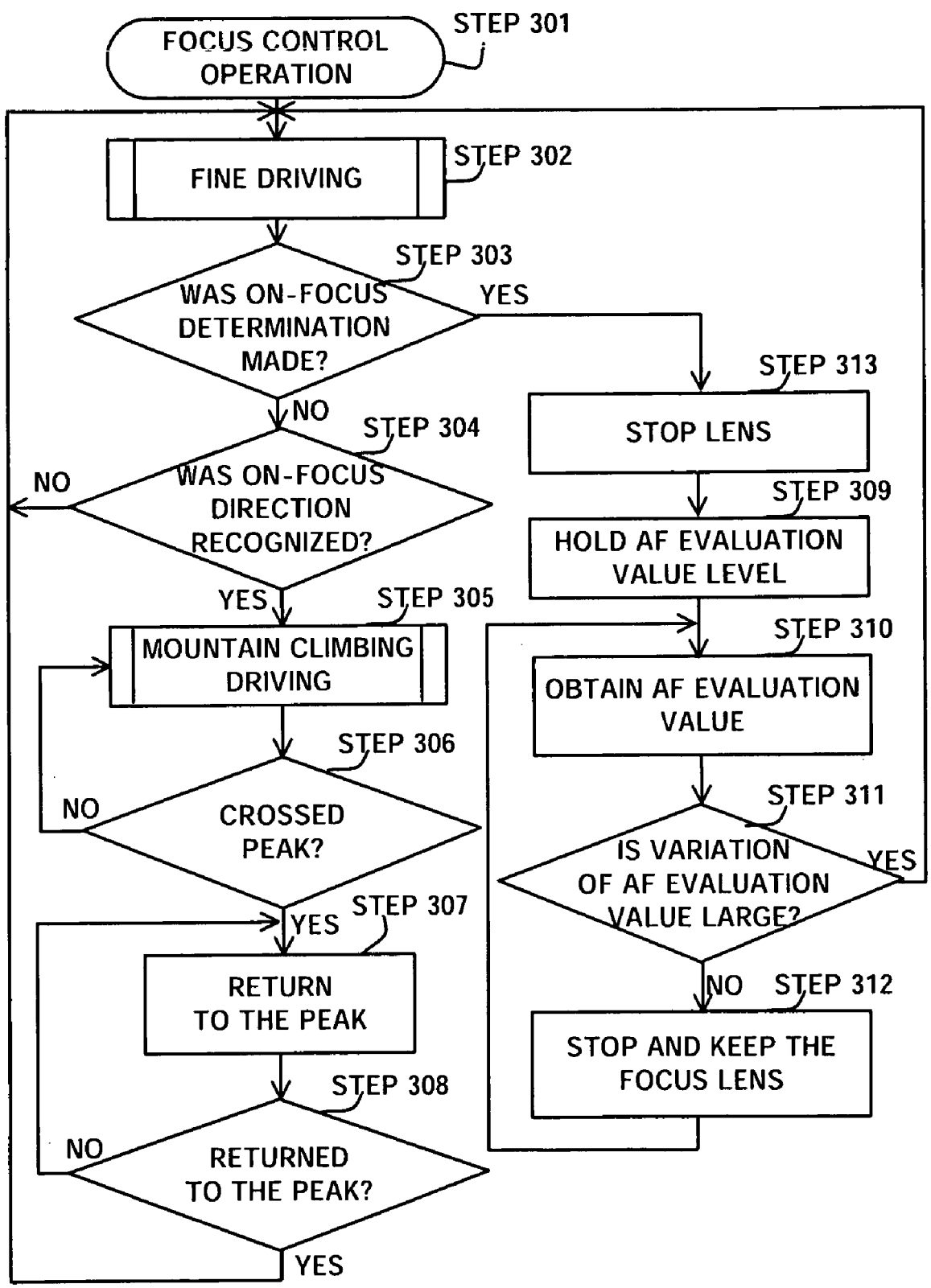
FIG. 2 is a flowchart for explaining focus control by a contrast detection method of the optical apparatus shown in FIG. 1.

FIG. 2 is a flowchart showing a focus control operation using the second focus detection circuit 142. In FIG. 2, when the focus control starts (step 301), the motor driving circuit 150 initially controls the motor 160 to provide wobbling driving of the focus lens 111 (step 302). In the "wobbling driving," the focus lens 111 is reciprocated by a predetermined fine amount in the infinite direction and in the closest direction. The motor driving circuit 150 detects a direction in which the on-focus position will exist, based on a change (or increase) of the AF evaluation signal. The motor driving circuit 150 determines, in the wobbling driving, that the direction which has been determined to be the on-focus direction a predetermined number of times is the direction in which the on-focus position will exist. In addition, the motor driving circuit 150 determines an area to be the on-focus position when the focus lens 111 reciprocates in the area a predetermined number of times. In this case, the flow proceeds to the following restart determination process.

Next, the motor driving circuit 150 determines whether the on-focus state determination was made through the wobbling driving (step 303). When determining that no on-focus determination has been made (step 303), the motor driving circuit 150 determines whether the on-focus direction has been recognized through the fine driving (step 304). When determining that no on-focus direction has been found (step 304), the motor driving circuit 150 returns to the step 302 to perform again the fine driving.

On the other hand, when determining that the on-focus direction has been recognized (step 304), the motor driving circuit 150 initiates mountain climbing driving (step 305). The "mountain climbing driving" drives the focus lens 111 by a predetermined driving amount every time in the on-focus direction. Next, the motor driving circuit 150 determines whether the AF evaluation value crosses a peak or whether the increasing AF evaluation value turns to decrease (step 306). When determining that the AF evaluation value has crossed the peak by the predetermined driving amount (step 306), the motor driving circuit 150 moves the focus lens 111 in the opposite direction by the predetermined driving amount (step 307). On the other hand, when determining that the AF evaluation value has not yet crossed the peak (step 306), the motor driving circuit 150 returns to the step 305 and continues the mountain climbing driving.

The motor driving circuit 150 again determines whether the AF evaluation value has crossed the peak after the step 307 (step 308). As a result, when it has not yet crossed the peak, the flow returns to the step 307 and continues the operation that returns the AF evaluation value to the peak. When the AF evaluation value reaches the peak, the on-focus position is set to there. Once the on-focus position is set, the flow returns to the step 302 to finely drive the focus lens 111 and to search of the on-focus position.

On the other hand, when determining that the on-focus determination was made in the step 303, the motor driving circuit 150 stops the focus lens 111 (step 313), and stores in a memory (not shown) the AF evaluation value corresponding to the on-focus state (step 309). Subsequently, the motor driving circuit 150 executes a restart determination process. The restart determination process initially takes in the latest (or present) AF evaluation value in the step 310. Next, a difference (or a variation amount) is calculated between the previous AF evaluation value stored in the memory and the present AF evaluation value obtained in the step 310. When the variation amount is greater than the predetermined value (step 311), the flow returns to the step 302 so as to again execute (restart) the focus control, whereby the wobbling driving starts to search for a new on-focus position. When the variation amount of the AF evaluation value is below the predetermined value (step 311), it is assumed that the on-focus state is maintained, the focus lens 111 is maintained stationary (step 312), and the flow returns to the step 310 to obtain a new AF evaluation value.

This method requires a small wobbling width for high-quality images. A large wobbling width may negatively affect an image to be recorded. For example, when the wobbling width is comparatively large in comparison with the depth of field of the optical system 110, a digital video signal output from the image sensor 120 causes a large blur. When the wobbling width is comparatively small in comparison with the depth of field of the optical system 110, a blur that would occur in the digital video signal output from the image sensor 120 can be reduced. In other words, for a highly precise focusing operation, the motor 160 that drives the focus lens 111 needs a high resolution.

In addition, in the mountain climbing driving the focus lens 111 is driven while it is determined whether or not the AF evaluation value crosses the peak; therefore, it is necessary to drive the focus lens 111 at a constant speed during the mountain climbing driving. In other words, the contrast detection method needs to drive at a constant speed the motor 160 that drives the focus lens 111.

Figure 3:
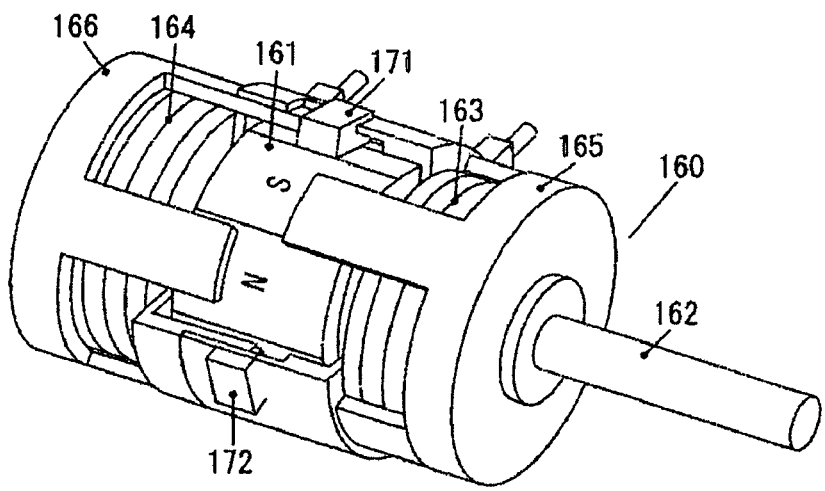
FIG. 3 is a perspective view of a motor and position sensors in the optical apparatus shown in FIG. 1.

FIG. 3 is a perspective view of the motor 160 and the position sensor 170 with partially cutaway components for explanation convenience. The motor 160 is configured as disclosed in Japanese Laid-Open Patent No. 09-331666. The motor 160 includes a rotor 162 having a magnet 161, a first coil 163, a second coil 164, a first yoke 165, and a second yoke 166. The position sensor 170 includes a first position sensor 171, and a second position sensor 172. The first coil 163, the second coil 164, the first yoke 165, the second yoke 166, the first position sensor 171, and the second position sensor 172 constitute a stator.

The magnet 161 is a cylindrical permanent magnet having an outer circumference magnetized with multiple poles. The magnet 161 has a magnetized pattern in which the magnetic force has a sinusoidal strength in the radial direction with respect to an angular position. The rotor 162 is supported rotatably by the stator, and integrally fixed with the magnet 161. The first yoke 165 has a plurality of pole teeth excited by the first coil 163. A torque given to the rotor 162 can be varied by changing an excited pole. The second yoke 166 has a plurality of pole teeth excited by the second coil 164. A torque given to the rotor 162 can be varied by changing an excited pole. The first position sensor 171 and the second position sensor 172 are Hall elements configured to detect the magnetic flux of the magnet 161, and output signals that shift in phase by an electric angle of 90°. Where n is the number of poles of the magnet 161, the electric angle 360° corresponds to 720/n° of the actual rotor angle.

The motor driving circuit 150 includes a feedback electrization switching driver (first driver) 151, a non-feedback electrization switching driver (second driver) 152, and a switching circuit 153.

The feedback electrization switching driver 151 drives the motor 160 according to the driving target signal of the focus lens 111 output from the focus control circuit 140. At that time, the feedback electrization switching driver 151 changes the electrization to the coil according to the detection signal output from the position sensor 170. The non-feedback electrization switching driver 152 drives the motor 160 according to the target driving signal of the focus lens 111 output from the focus control circuit 140. In that case, the non-feedback electrization switching driver 152 switches the electrization to the coil according to an input driving pulse interval (driving frequency) or a determined time interval. This driving method is equivalent with a driving method for a usual two-phase stepping motor. In driving the motor 160, the switching circuit 153 selects the feedback electrization switching driver 151 or the non-feedback electrization switching driver 152. As will be described later, the driver 151 can move the focus lens 111 faster than the driver 152. On the other hand, the driver 152 can position the focus lens 111 at an on-focus position more precisely than the driver 151.

The non-feedback electrization switching driver 152 provides the motor 160 the non-feedback electrization switching driving. The non-feedback electrization switching driver 152 sequentially switches between the electrization to the first coil 163 and the electrization to the second coil 164 in accordance with the input driving pulse interval (driving frequency) and the rotational direction, thereby rotating the rotor 162 at a desired speed. In addition, the non-feedback electrization switching driver 152 can rotate the rotor 162 by a desired angle in accordance with the number of input driving pulses. The non-feedback electrization switching driving can precisely control the speed by an input driving pulse interval. In addition, low-speed but stable driving is available. Moreover, since one step can be divided by micro step driving for positioning, a high resolution and high controllability of a fine displacement are available. However, when the pulse interval is made small (or when the driving frequency is made large), the rotor cannot respond to switching of the electrization to the coil, and the step out is likely to occur. Hence, it is necessary to provide a lower limit to the driving pulse interval and to expect a predetermined safety ratio to an actual load, and high-speed driving is restricted.

Figure 4:
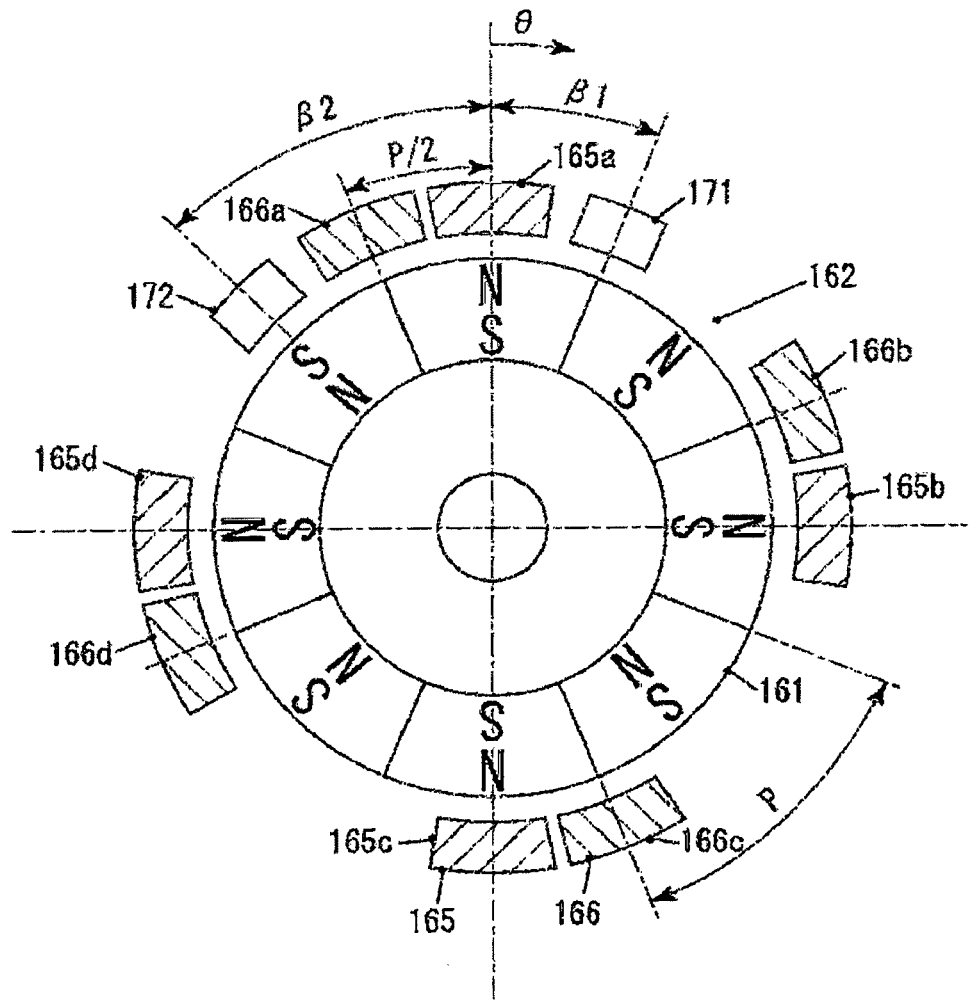
FIG. 4 is a sectional view in an axial direction showing a phase relationship between yokes, position sensors, and a rotor shown in FIG. 3.

The motor 160 can rotate by the feedback electrization switching mode that switches electrization by the signal of the first position sensor 171 or the second position sensor 172. FIG. 4 is a sectional view in the axial direction showing a phase relationship among the yokes, the position sensors, and the rotor, and FIG. 5 is a sectional view in the axial direction showing an operation of the feedback electrization switching mode. In FIGS. 4 and 5, the clockwise is a positive direction. 165a to 165d denote pole teeth of the first yoke 165, and 166a to 166d are pole teeth of the second yoke 166. In this embodiment, the magnet 161 has 8 poles with a magnetization angle P of 45°. In addition, when the first yoke 165 is used as a reference, the phase P/2 of the second yoke 166 is −22.5°, the first position sensor 171 has a phase β1 of +22.5°, and the second sensor 172 has a phase β2 of −45°.

The following description discusses an operation of the feedback electrization switching mode by using the electric angle. The electric angle is expressed on the assumption that one period of the magnet's power is 360°, and an electric angle θ is expressed as follows where M is the rotor's pole number, $\theta_O$ is an actual angle:

$$\theta = 2 \times \theta_O / M \quad \text{EQUATION 1}$$

Each of a phase difference between the first yoke 165 and the second yoke 166, a phase difference between the first position sensor 171 and the second position sensor 172, a phase difference between the first yoke 165 and the first position sensor 171 is an electric angle of 90°. In FIG. 4, the first yoke's pole teeth center opposes to the magnet's N pole center. This state is the rotor's initial state, and an electric angle is 0°.

Figure 6:
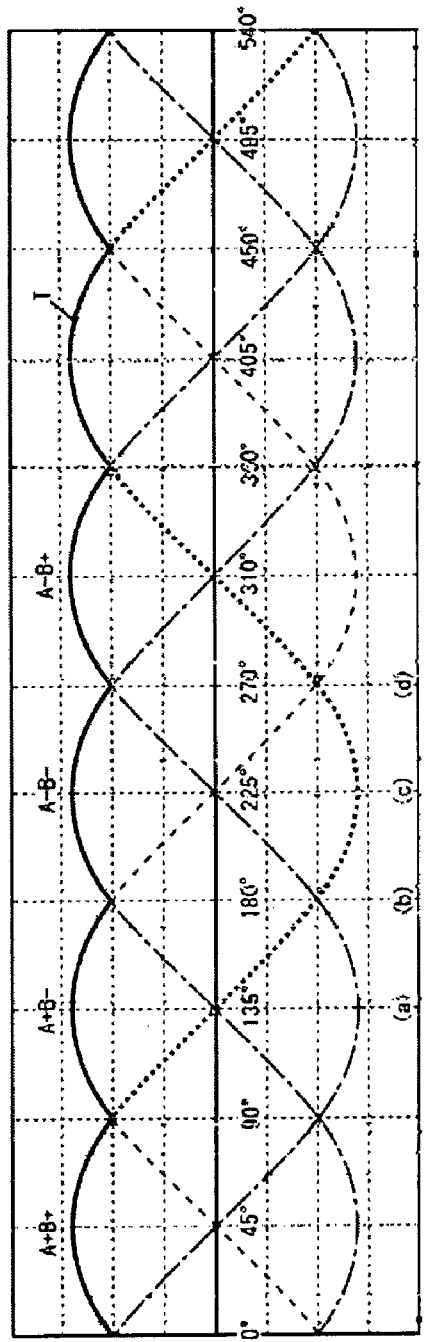
FIG. 6 is a graph showing a relationship between a rotor's rotational angle and a motor torque in the feedback electrization switching mode, and a graph showing a relationship between the rotor's rotational angle and the sensors' outputs.
Figure 6:
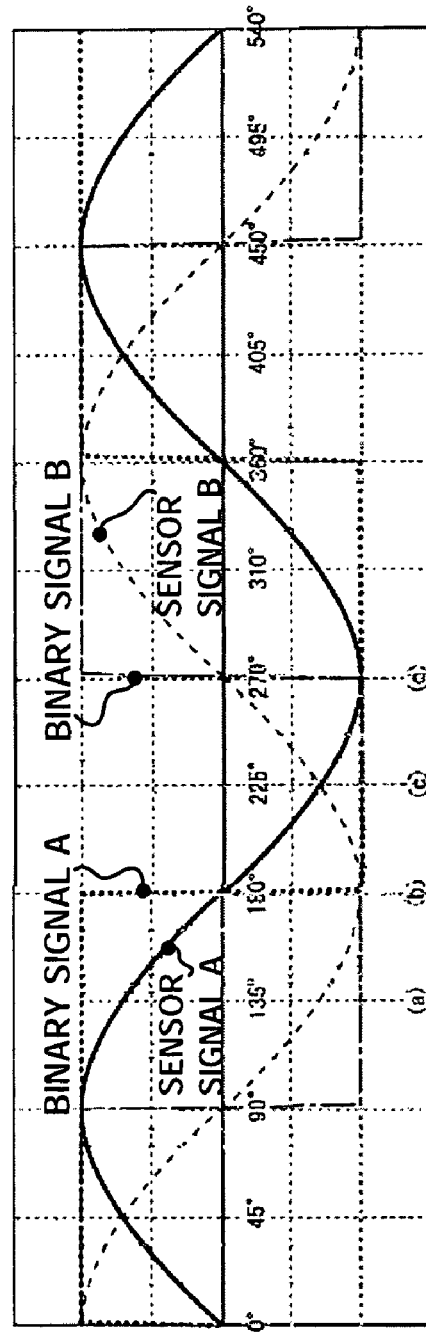

FIG. 6(1) is a graph showing a relationship between the rotor's rotational angle and the motor torque, where the abscissa axis denotes an electric angle and the ordinate axis denotes a motor torque. Assume that a motor torque that rotates the rotor clockwise is positive. When the current in the positive diction is flowed in the first coil 163, the first yoke 165 is magnetized with an N pole, and an electromagnetic force is generated between the first yoke 163 and the magnetic pole of the magnet 161. When the current in the positive direction is flowed in the second coil 164, the second yoke 166 is magnetized with an N pole, and an electromagnetic force is generated with the second yoke 166 and the magnetic pole of the magnet 161. When two electromagnetic forces are synthesized, a schematically sinusoidal torque is obtained as the rotor rotates (torque curve A+B+). In other electrization states, similarly, schematically sinusoidal torques are obtained (torque curves A+B−, A−B−, A−B+). In addition, the first yoke is arranged relative to the second yoke with a phase of an electric angle of 90°, and thus four torques have phase differences of an electric angle of 90°.

FIG. 6(2) is a graph showing a relationship between the rotor's rotational angle and the sensor output, where the abscissa axis denotes an electric angle and the ordinate axis denotes an output of a position sensor. The magnet 161 has a schematically sinusoidal magnetized pattern relative to the electric angle in the radial direction. Therefore, a schematically sinusoidal signal is obtained from the first position sensor 171 (position sensor signal A). In this embodiment, the first position sensor 171 outputs a positive value when opposing to the N pole of the magnet 161. The second position sensor 172 is shifts from the first position sensor 171 by a phase of an electric angel of 90°, and thus a cosine wave signal is obtained from the second position sensor 172 (position sensor signal B). In this embodiment, the second position sensor 172 inverts its polarity relative to the first position sensor 171, and thus outputs a positive value when opposing to the S pole of the magnet 161.

A binary signal A is made by converting the position sensor signal B into a binary form, and a binary signal B is made by converting the position sensor signal B into a binary form. In the feedback electrization switching mode, the electrization to the first coil is switched based on the binary signal A, and the electrization to the second coil is switched based on the binary signal B. In other words, when the binary signal A has a positive value, the current in the positive direction is flowed in the first coil, and when the binary signal A has a negative value, the current in the reverse direction is flowed in the first coil. In addition, the current in the positive direction is flowed in the second coil when the binary signal B has a positive value, and the current in the reverse direction is flowed in the second coil when the binary signal B has a negative value.

Next follows a description of an operation of the feedback electrization switching mode. FIG. 5A shows a state in which the rotor 162 rotates by an electric angle of 135°. An output of each sensor has a value shown FIG. 6(2)(a), in which the binary signal A has a positive value, the binary signal B has a negative value. Thus, the current flows in the first coil 163 in the positive direction, and the first yoke 165 is magnetized with the N pole; the current flows in the second coil 164 in the reverse direction, and the second yoke 166 is magnetized with the S pole. As a consequence, a clockwise torque corresponding to the torque curve A+B− shown in FIG. 6(1) occurs, and the rotor 162 rotates in response to a rotational force in the θ direction. FIG. 5B shows a state in which the rotor 162 rotates by an electric angle of 180°. The first position sensor 171 is located at the boundary between the N pole and the S pole of the magnet 161. Therefore, the binary signal A is switched at the border of the electric angle of 180° between a positive value and a negative value, and the electrization direction to the first coil 163 is switched from the positive direction to the reverse direction. This electric angle accords with the electric angle of the nodal point between the torque curve A+B− and the torque curve A−B−.

FIG. 5B' shows a state in which the rotor 162 rotates by the electric angle of 180°, and the electrization direction to the first coil 163 is switched. The current is flowed in the first coil 163 in the reverse direction, and the first yoke 165 is magnetized with the S pole; the current is flowed in the second coil 164 in the reverse direction, and the second yoke 166 is magnetized with the S pole. At this time, a clockwise torque corresponding to the torque curve A−B− shown in FIG. 6(1) occurs, and the rotor 162 rotates in response to the rotational force in the θ direction.

FIG. 5C shows a state in which the rotor 162 rotates by an electric angle of 225°. An output of each sensor has a value shown in FIG. 6(2)(c), and both the binary signals A and B have negative values. Therefore, the current in the negative direction flows in the first coil 163 and the first yoke 165 is magnetized with the S pole, and the current in the reverse direction flows in the second coil 164 and the second yoke 166 is magnetized with the S pole. At this time, a clockwise torque occurs corresponding to the torque curve A−B− shown in FIG. 6(1), and the rotor 162 rotates in response to the rotational force in the θ direction.

FIG. 5D shows a state in which the rotor 162 rotates by an electric angle of 270°. The second sensor 172 is located at the boundary between the N pole and the S pole of the magnet 161. Therefore, at the boundary of an electric angle of 270°, the binary signal B switches from a negative value to a positive value and the electrization direction of the second coil 164 is switched from the reverse direction to the positive direction. This electric angle accords with an electric angle of the nodal point between the torque curve A−B− and the torque curve A−B+.

FIG. 5D' shows a state in which the rotor 162 rotates by the electric angle of 270°, and the electrization direction to the second coil 164 is switched. The current flows in the second coil 164 in the positive direction, and the second yoke 166 is magnetized with S pole; the current flows in the first coil 163 in the reverse direction, and the first yoke 165 is magnetized with S pole. At this time, a clockwise torque corresponding to the torque curve A−B+ shown in FIG. 6(1) occurs, and the rotor 162 rotates in response to the rotational force in the θ direction.

By repeating the above operations, the rotor 162 can be rotated continuously. In addition, when positive and negative of the binary signal A or B is inverted, a reverse rotation is also available.

In the feedback electrization switching mode, the rotor 162 can be rotated by a desired angle by inputting a driving pulse number and a rotating direction. In addition, control over the current that flows in the coil can vary a magnetic force between the pole tooth of each yoke and a magnet's power, control a rotational force applied to the rotor 162, and rotate the rotor 162 at a desired speed.

In the feedback electrization switching mode, a characteristic of the motor 160 can be changed by advancing a phase of a signal of the position sensor. When the rotation is made at a high speed in the feedback electrization switching mode, an electrization switching period is shortened. A short electrization switching period delays a leading edge of the current value in comparison with the electrization switching period due to the inductance influence of the coil, and the torque becomes lower. However, a fast phase of the signal of the position sensor can prevent a delay of a leading edge of the current value and restrain a decrease of the torque in the high speed state.

The feedback electrization switching mode switches the electrization at the electric angle corresponding to a nodal point between the torque curves, and can maximize the torque derived from the motor 160 (FIG. 6(1), torque curve T).

In the non-feedback electrization switching mode, as a driving frequency becomes higher, a rotation of the rotor 162 cannot follow the electrization switching and may cause stepping out. On the other hand, the feedback electrization switching mode switches the electrization while detecting a position of the rotor 162, and thus the stepping out is unlikely to occur under proper control. Hence, a restriction of the driving speed and an expectation of the safety ratio, which are required for the non-feedback electrization switching mode, are not necessary. The feedback electrization switching mode can provide faster and higher efficiency driving than the non-feedback electrization switching mode. The feedback electrization switching mode can provide velocity control by controlling the current that flows in the coil. However, it requires a low current value in the low-speed driving, and causes a lowered torque. Therefore, the positioning precision lowers in the low-speed driving.

The non-feedback electrization switching mode switches the electrization in accordance with the driving frequency provided from the outside of the motor, and thus can control the rotor 162 at a constant speed. In addition, the non-feedback electrization switching mode can provide precise speed control with few velocity variations by controlling the driving frequency. On the other hand, the feedback electrization switching mode switches the electrization while detecting the position of the rotor 162, and thus the velocity of the rotor 162 varies when the load varies.

This embodiment detects a magnetic flux of the rotor magnet through a magnetic sensor, and controls the electrization timing. However, a method of detecting the rotor's position is not limited. A detection magnet that displaces along with a rotation of the rotor 162 may be arranged and detected, or an optical sensor may read a light shielding plate or a patterned surface. In addition, a position sensor may be integrally fixed onto the motor 160, or fixed onto a member separate from the motor 160. This driving method (feedback electrization switching mode) is a driving method by a driver that switches the electrization state of the coil in the motor 160 in accordance with an output of the position sensor.

Figure 7:
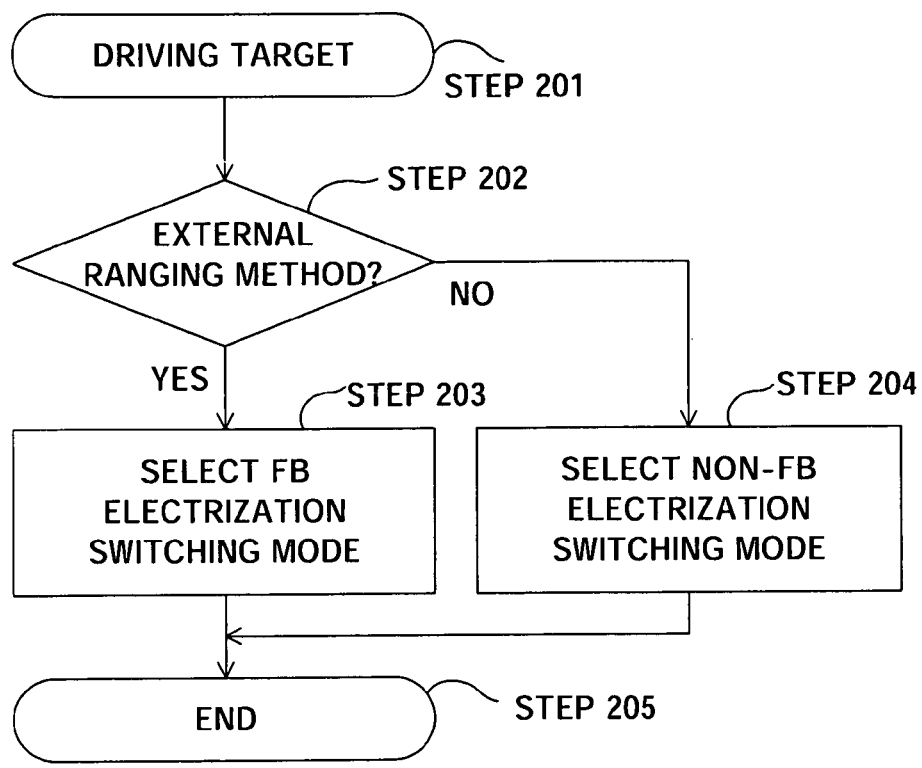
FIG. 7 is a flowchart showing an operation of a switching circuit shown in FIG. 1.

FIG. 7 is a flowchart showing an operation of the switching circuit 153. When a driving target signal of the focus lens 111 is input from the focus control circuit 140 (step 201), the switching circuit 153 determines whether or not the current focus control is the external ranging method (step 202). When determining that the focus control uses the first focus detection circuit 141 (step 202), the switching circuit 153 selects the feedback electrization switching mode to output the driving target signal of the focus lens 111 to the feedback electrization switching driver 151 (step 203). On the other hand, when determining that the focus control uses the second focus detection circuit 142 (step 202), the switching circuit 153 selects the non-feedback electrization switching mode for the driving method and outputs the driving target signal of the focus lens 111 to the non-feedback electrization switching driver 152 (step 204). The process ends after the step 203 or 204 (step 205).

The current position of the focus lens 111 is detected by counting the driving target signal of the focus lens 111 input to the motor driving circuit 150, but a detection method of the current position is not limited to this embodiment. The current position of the focus lens 111 may be directly detected by a position sensor, or the current position of the focus lens 111 may be calculated by counting the number of electrization pulses input to the motor 160.

Figure 8:
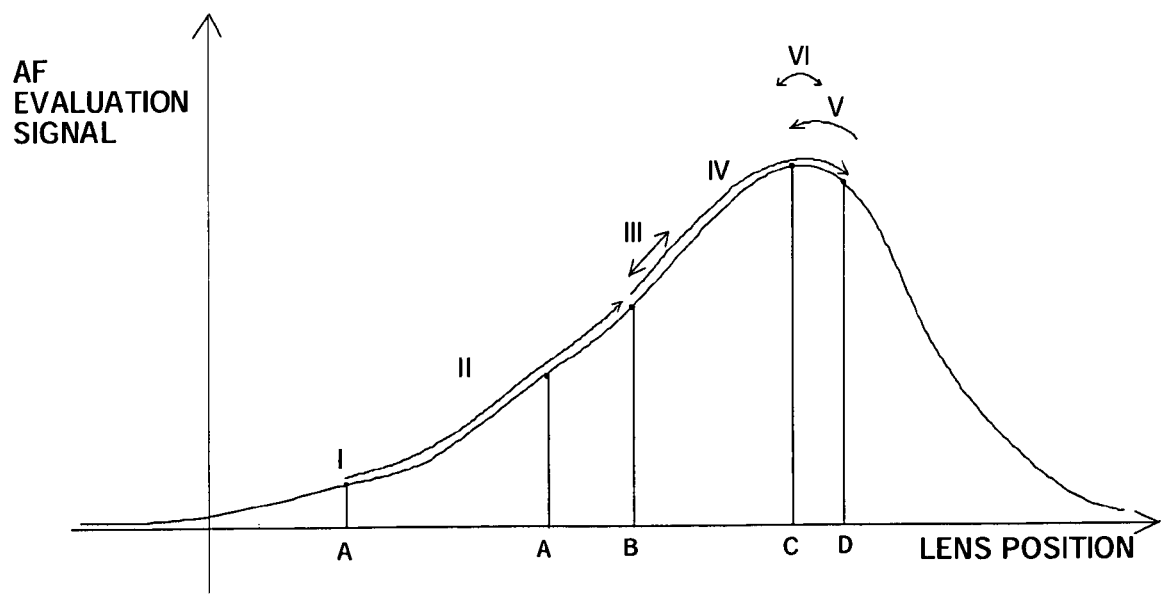
FIG. 8 is a graph for explaining focus control of the optical apparatus shown in FIG. 1.

Next follows a description of the focus control operation of the optical apparatus 100. FIG. 8 is a graph for explaining the focus control of the optical apparatus 100. The abscissa axis denotes a position of the focus lens 111, and the ordinate axis denotes an AF evaluation signal in the contrast detection method.

When the optical apparatus 100 initiates the focus control operation at a position A (point I), it calculates a defocus amount by using the external ranging method as well as a driving target of the focus lens 111 (position B).

The motor 160 rotates in accordance with the driving target of the focus lens 111, and the focus lens 111 moves from the position A to the position B. In this case, the motor 160 operates in the feedback electrization switching mode selected by the switching circuit 153. Therefore, the focus lens 111 can be driven at a higher speed and with higher efficiency than those of the non-feedback electrization switching mode, and can shorten a time period necessary to obtain the on-focus state. When the focus lens 111 moves to the driving target (or the position B) of the focus lens 111 calculated by the external ranging method, the focus control circuit 140 switches the external ranging method to the contrast detection method. Accordingly, the switching circuit 153 selects the non-feedback electrization switching mode for the motor 160.

When the contrast detection method is selected at the position B, the wobbling operation is initiated as shown by III to find the on-focus state and the on-focus direction. In this case, the motor 160 is driven by the non-feedback electrization switching mode, has a high resolution and high controllability of a fine displacement. Therefore, a blur that would otherwise occur in an image can be restrained. It is known that the stepping motor steps out with an input of an excessively large acceleration. When the non-feedback electrization switching mode is selected at the position B, an excessively large acceleration is input due to wobbling and the stepping out may occur. A deceleration control is effective which gradually decreases a moving velocity from a position A' to the position B.

When the on-focus direction is recognized as shown in IV, the mountain climbing driving follows to find a peak. Since the motor 160 is driven in the non-feedback electrization switching mode, constant-speed mountain climbing driving is available. Even when a gradient of the AF evaluation signal is low, low-speed mountain climbing driving is available.

When the focus lens 111 reaches the position D, the AF evaluation signal is determined to cross the peak and an operation follows to return the focus lens 111 to the peak by moving it by a predetermined driving amount as shown by V.

When the focus lens 111 reaches a vicinity of a final on-focus position (position C), the wobbling operation is again performed. As a result, when the on-focus state is determined, the focus lens 111 is stopped and set to the final on-focus position. In this case, the motor 160 is driven in the non-feedback electrization switching mode, and has a high resolution. Therefore, the final focusing precision can improve.

In this way, the optical apparatus 100 drives the focus lens 111 in the feedback electrization switching mode by using the phase-difference detection method or the external ranging method, and drives the focus lens 111 by using the non-feedback electrization switching mode in the contrast detection method. Therefore, the optical apparatus 100 can provide a focusing operation at a high speed and with a high precision.

Second Embodiment

Figure 9:
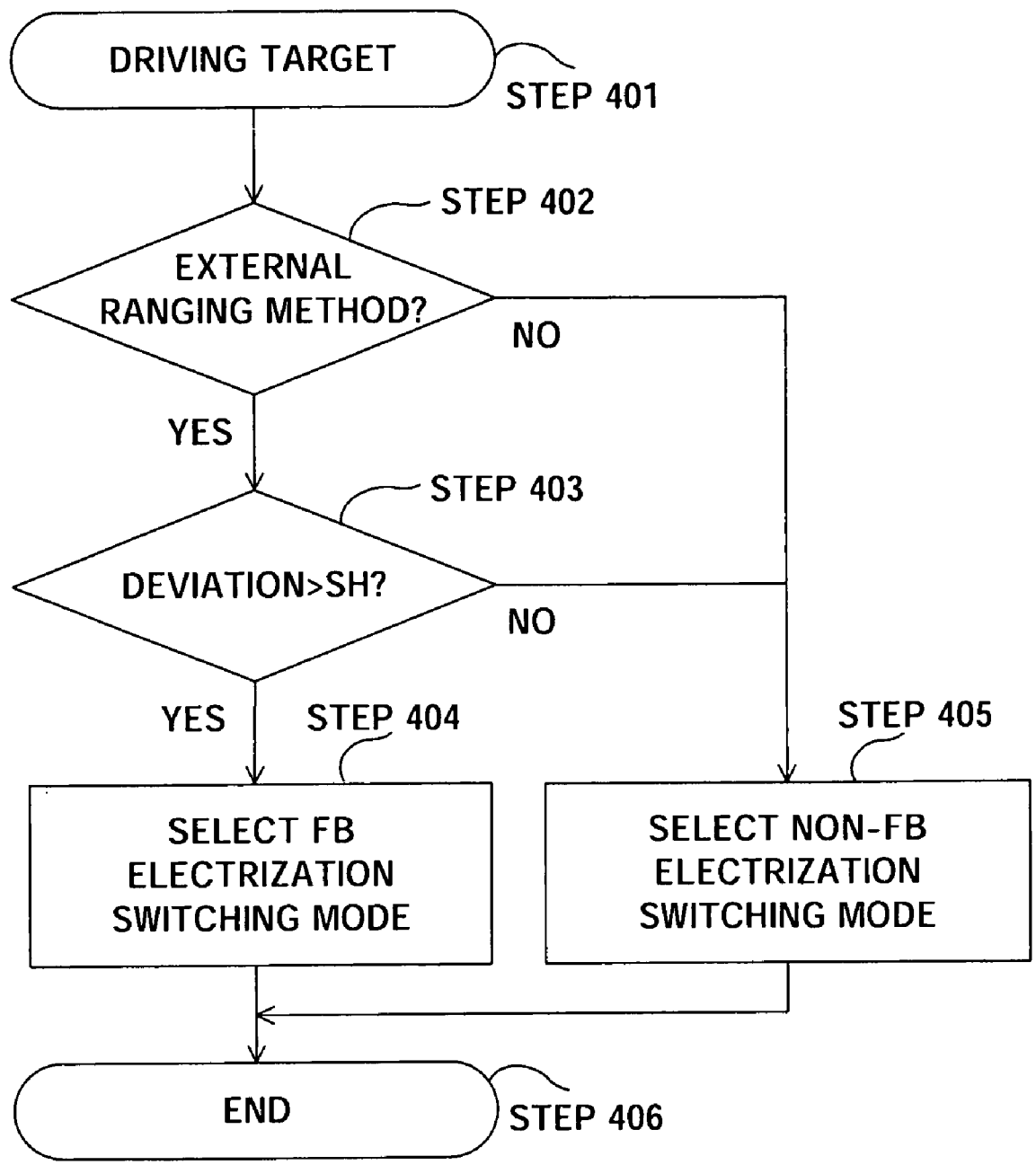
FIG. 9 is a flowchart of a switching circuit according to a second embodiment.

In this embodiment, a duplicate description of common part of the first embodiment will be omitted. FIG. 9 is a flowchart showing an operation of the switching circuit 153. When a driving target signal is input from the focus control circuit 140 (step 401), the switching circuit 153 determines whether the current focus control operation is the external ranging method that uses the first focus detection circuit 141 (step 402). When the focus control operation is the external ranging method, the flow proceeds to the step 403. Otherwise, the driving method is switched to the non-feedback electrization switching mode, and the driving target signal of the focus lens 111 is output to the non-feedback electrization switching driver 152 (step 405). In this case, the focus control operation is the contrast detection method that uses the second focus detection circuit 142.

In the step 403, the selecting circuit 153 determines whether a deviation (or difference or distance) between the driving target position and the current position of the focus lens 111 is greater than a threshold SH. When the deviation is greater than the threshold SH, the selecting circuit 153 selects the feedback electrization switching mode and the driving target signal of the focus lens 111 is output to the feedback electrization switching driver 151 (step 404). When the deviation is equal to or smaller than the threshold SH, the selecting circuit 153 selects the non-feedback electrization switching mode for the driving method, and the driving target signal of the focus lens 111 is output to the non-feedback electrization switching driver 152 (step 405). The procedure ends after the step 404 or 405 (step 406).

The current position of the focus lens 111 can be detected by counting the driving target signal of the focus lens 111 input to the motor driving circuit 150, but the detection method of the current position is not limited to this embodiment. The current position of the focus lens 111 may be directly detected by the position sensor, or the current position of the focus lens 111 may be calculated by counting the number of electrization pulses input to the motor 160.

The threshold SH is set, for example, to a distance corresponding to 10 steps used to drive the motor 160 by a two-phase driving method. When d=SH in FIG. 8, the feedback electrization switching mode is switched to the non-feedback electrization switching mode at the position A'. At this time, the focusing precision in the external ranging method improves because the non-feedback electrization switching mode having a high resolution is used near the driving target (position B) in the external ranging method.

In addition, when the feedback electrization switching mode is used for driving between the position A' and the position B in FIG. 8, the current and the torque become lower due to the deceleration control. Therefore, the driving of the focus lens 111 can become unstable. However, this embodiment selects the feedback electrization switching mode for the deceleration control, and stabilizes driving of the focus lens 111 in the deceleration control, providing a highly precise focusing action.

Thus, the optical apparatus 100 drives the focus lens 111 in the feedback electrization switching mode until the focus lens 111 moves to a position within a predetermined deviation from the driving target in the phase-difference detection method or external ranging method. When the focus lens 111 moves to the position within the predetermined deviation from the driving target, the non-feedback electrization switching mode is selected to drive the focus lens 111. In addition, in the contrast detection method, the focus lens 111 is stepwise driven. Thereby, the optical apparatus 100 can provide a high-speed and highly accurate focusing operation.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. For example, the focus lens 111 may include one lens or a plurality of lenses, as long as it serves to change a focal point. In addition, the motor driving circuit 150 in the above embodiment includes the feedback electrization switching driver (first driver) 151, the non-feedback electrization switching driver (second driver) 152, and the switching circuit 153. However, only one driver may be provided and serve as both the first driver and the second driver. For example, the first driver and the second driver may be provided as a program. In addition, the focus control circuit 140 in the above embodiments includes the focus detection circuit 141 and the second focus detection circuit 142. However, only one circuit may be provided and serve as both the first focus detection circuit and the second focus detection circuit. For example, the first focus detection circuit and the second focus detection circuit may be provided as a program.

In addition, in the above embodiments, the position sensor 170 detects the rotor position in the motor 160, and outputs a detection signal. Alternatively, the rotor position does not have to be directly detected as long as detection and the rotor position have a one-by-one correspondence; for example, the rotor position may be detected by detecting a position of a member that rotates with a rotation of the rotor, although the number of components increases.

This application claims the benefit of Japanese Patent Application No. 2008-001607, filed on Jan. 8, 2008 which is hereby incorporated by reference herein in its entirety.

What is claimed is:

1. A focus controller configured to control focus of an optical system that includes a focus lens, said focus controller comprising:
    an AF sensor configured to obtain information corresponding to a distance to a subject based on a luminous flux from the subject;
    a first focus detector configured to detect a focus state based on a measurement result of the AF sensor;
    a second focus detector configured to detect the focus state based on a contrast value of an image formed by the optical system;
    a motor that is configured to drive the focus lens and includes a rotor having a magnet, and a stator having a coil configured to provide a torque to the magnet;
    a position sensor configured to detect a position of the rotor of the motor;
    a first driver configured to switch an electrization to the coil in the motor in accordance with an output of the position sensor;
    a second driver configured to switch the electrization to the coil of the motor in accordance with a preset time interval; and
    a switching circuit configured to select the first driver for the electrization to the coil of the motor in performing focus control using the first focus detector, and to select the second driver in the electrization to the coil of the motor in performing focus control using the second focus detector.

2. The focus controller according to claim 1, wherein the first driver moves the focus lens faster than the second driver, and the second driver positions the focus lens more precisely than the first driver, and
    wherein the switching circuit moves the focus lens through the second driver after moving the focus lens through the first driver.

3. The focus controller according to claim 1, wherein the switching circuit selects the first driver when a distance between a current position and an on-focus position of the focus lens is larger than a threshold, and selects the second driver when the distance is equal to or smaller than the threshold.

4. The focus controller according to claim 1, wherein the first focus detector obtains an on-focus position through a phase-difference detection method or an external ranging method, and the second focus detector obtains the on-focus position through a contrast detection method.

5. An optical apparatus comprising:
    an optical system that includes a focus lens; and
    a focus controller according to claim 1 configured to control focus of the optical system.

6. A control method for a focus controller configured to control focus of an optical system that has a focus lens, and the focus controller including a motor that is configured to drive the focus lens, and includes a rotor having a magnet, and a stator having a coil configured to provide a torque to the magnet, and a position sensor configured to detect a position of the rotor in the motor, said control method comprising switching an electrization to the coil in the motor in accordance with an output of the position sensor in detecting a focus state based on information corresponding to a distance to a subject which is calculated from a luminous flux from the subject, and switching the electrization to the coil in the motor in accordance with a preset time interval in detecting the focus state based on a contrast value of an image formed by the optical system.

* * * * *